United States Patent
Yamada

(10) Patent No.: US 7,538,310 B2
(45) Date of Patent: May 26, 2009

(54) LASER BEAM IRRADIATION DEVICE WITH ERROR POSITION DETECTION

(75) Inventor: Masato Yamada, Inuyama (JP)

(73) Assignee: Sanyo Electric Co., Ltd., Osaka (JP)

(*) Notice: Subject to any disclaimer, the term of this patent is extended or adjusted under 35 U.S.C. 154(b) by 81 days.

(21) Appl. No.: 11/393,669

(22) Filed: Mar. 31, 2006

(65) Prior Publication Data
US 2006/0219875 A1  Oct. 5, 2006

(30) Foreign Application Priority Data
Mar. 31, 2005   (JP) .............................. 2005-101048

(51) Int. Cl.
G06M 7/00 (2006.01)
G01C 3/08 (2006.01)
G01C 1/00 (2006.01)

(52) U.S. Cl. ................ 250/221; 356/141.1; 356/4.01

(58) Field of Classification Search ............... 356/3.09; 250/201.1, 201.9, 206.1, 206.2, 204, 205; 180/167–169
See application file for complete search history.

(56) References Cited

U.S. PATENT DOCUMENTS

| | | | |
|---|---|---|---|
| 5,489,983 A * | 2/1996 | McClenahan et al. | 356/139.09 |
| 5,515,156 A * | 5/1996 | Yoshida et al. | 356/5.01 |
| 5,831,717 A * | 11/1998 | Ikebuchi | 356/4.01 |
| 5,939,704 A * | 8/1999 | Perrie et al. | 250/201.1 |
| 5,959,571 A * | 9/1999 | Aoyagi et al. | 342/70 |
| 6,819,407 B2 * | 11/2004 | Arita et al. | 356/4.01 |
| 7,259,367 B2 * | 8/2007 | Reime | 250/227.25 |
| 2004/0065814 A1 * | 4/2004 | Miyazaki et al. | 250/222.1 |
| 2004/0257556 A1 * | 12/2004 | Samukawa et al. | 356/4.01 |

FOREIGN PATENT DOCUMENTS

JP 2005-010094  1/2005

* cited by examiner

Primary Examiner—Georgia Y Epps
Assistant Examiner—Jennifer Bennett
(74) Attorney, Agent, or Firm—McDermott Will & Emery LLP

(57) ABSTRACT

A DSP control circuit monitors a scan position of laser beams on the target region based on a signal from a PSD. Further, the DSP control circuit measures an amount of laser beams reflected from the target region for each scan position based on a signal from a beam receiving portion. The DSP control circuit compares an amount of reflected beams P0 at a scan position (reference position) on the target region with an amount of reflected beams Pk at a scan position adjacent to the scan position. If Pk/P0 is equal to or smaller than a threshold value Rs, it is determined that the scan position corresponding to the amount of reflected beams Pk is nonuniform in irradiation intensity of the laser beams. The DSP control circuit increases emission intensity plurality of times for the position that is determined to be nonuniform in irradiation intensity of the laser beams. With this, it is possible to make irradiation intensityies of the laser beams uniform over the target region.

11 Claims, 16 Drawing Sheets

POSITION-VOLTAGE CHARACTERISTICS

STRUCTURE OF PSD

B

TARGET REGION

BEAM TRAJECTORY

A

EXAMPLE OF SCAN TRAJECTORY x2

EFFECTIVE BEAM RECEIVING FACE

Y2 — Y1 x1

SPOT TRAJECTORY ON PSD

TARGET REGION

IRRADIATION POSITION

BLOCK

BEAM IRRADIATION DEVICE

SCAN OPERATION

*Fig.12*
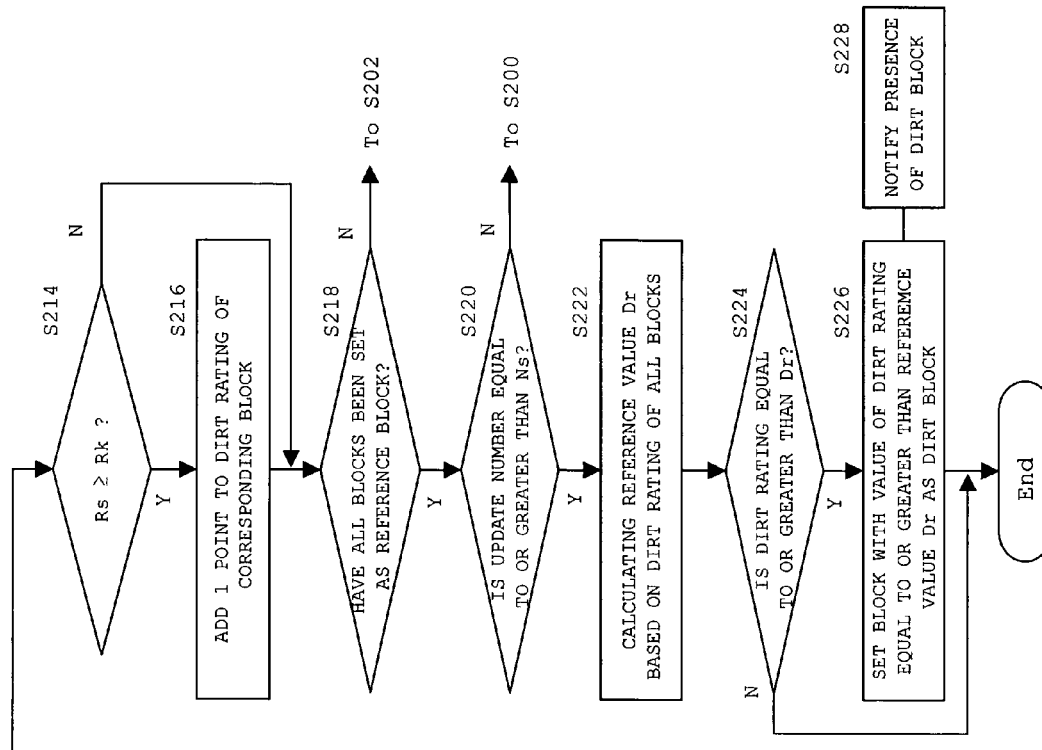
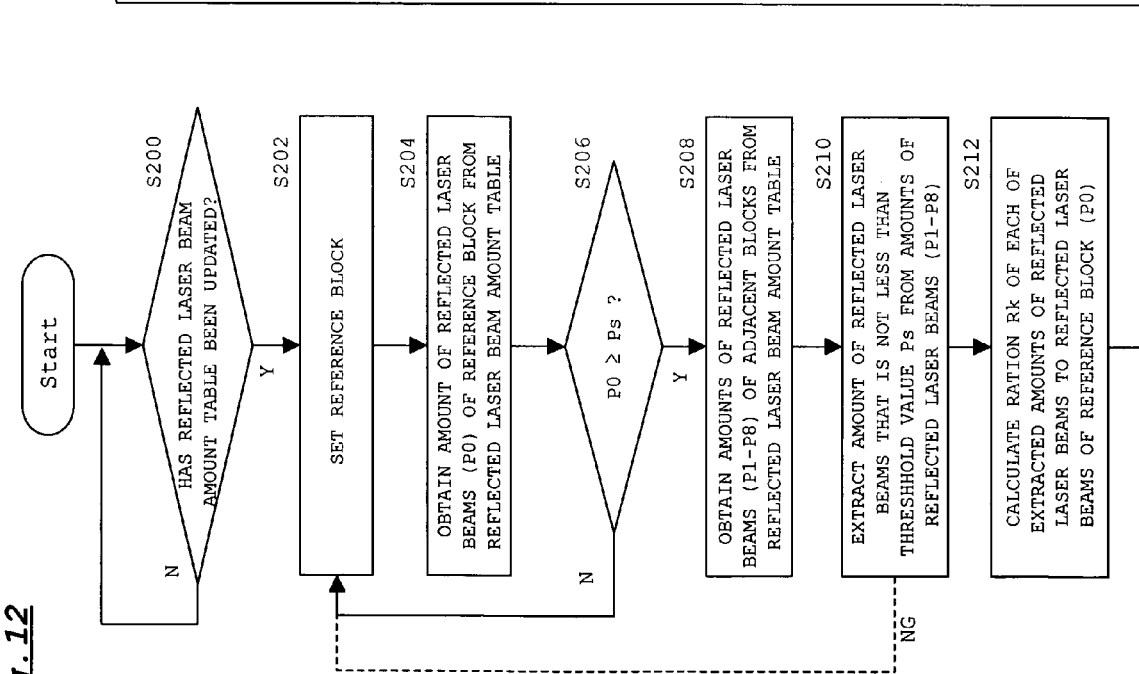

LASER BEAM IRRADIATION DEVICE WITH ERROR POSITION DETECTION

BACKGROUND OF THE INVENTION

1. Field of the Invention

The present invention relates to a beam irradiation device suitably used for, for example, vehicle-to-vehicle distance detectors, distance detectors, and the like.

2. Description of the Related Art

In recent years, vehicle-to-vehicle distance detectors and distance detectors using laser beams have been employed in various devices. A vehicle-to-vehicle distance detector, for example, detects the presence or absence of an obstacle and measures a distance to the obstacle by detecting reflected beams that are obtained when laser beams are radiated from a front portion of a vehicle. In this case, the laser beams are caused to longitudinally and laterally scan a target region preset in a front space. A time difference between timing for radiating the laser beams and timing for receiving the reflected beams is measured at each scan position, and a distance to an obstacle located in front of each scan position is calculated from a result of the measurement.

These detectors employ a so-called beam irradiation device that irradiates a target region with laser beams while longitudinally and laterally scanning the target region. This beam irradiation device is provided with, in order to protect an interior thereof from an external environment, a transparent window (output window) at a laser beam window. This output window is constituted from such as a glass plate or a resin plate.

However, in a case where dirt, water droplets, and the like are attached to, or such as a flaw or a breakage occurs to this output window, power of the laser beams attenuates when passing through these potions of the output window. As a result, measurement performance declines. Such a decline in measurement becomes a serious problem when the beam irradiation device is for an in-vehicle application. Therefore, especially when the beam irradiation device is used in-vehicle, it is necessary to configure the beam irradiation device to irradiate the laser beams uniformly over an entirety of the target region.

Japanese Patent Application Laid-Open No. 2005-10094 discloses a technique for detecting an attachment of dirt to the output window as described below. According to this technique, the presence of dirt on the output window is determined based on a time period between timing for radiating of the laser beams and timing for receiving of the reflected beams as well as an intensity of the reflected beams. Specifically, the laser beams are irradiated for a plurality of times, and laser beams with a time period from irradiation to reception of the reflected beams shorter than a threshold value and an intensity of the reflected beams is greater than a threshold value are detected from the laser beams irradiated for the plurality of times. Then, it is determined that dirt is attached to the output window, when the number of the detection of such laser beams is equal to or greater than a predetermined number.

However, with this conventional technique, when the laser beams irradiated from a semiconductor laser are reflected on the dirt attached to the output window into the beam irradiation device, the reflected beams leak to a beam receiving portion for receiving reflected beams from the target region. The leaked beams appear as noise in beam reception signals during a normal scan operation, and, as a result, cause such a problem of deterioration in accuracy in vehicle-to-vehicle distance detection and distance detection.

SUMMARY OF THE INVENTION

An object of the present invention is to provide a beam irradiation device capable of detecting nonuniformity of irradiation intensity of laser beams over a target region with a simple constitution. Further, the present invention also aims to provide a beam irradiation device capable of irradiating laser beams with a uniform light intensity over the target region based on the detection results.

A beam irradiation device according to a first aspect of the present invention includes a light source that emits laser beams; a scan means for scanning a target region with the laser beams emitted from the light source; a irradiation position detection means for detecting irradiation positions of the laser beams on the target region; a beam receiving means for detecting amounts of the laser beams reflected from the target region; and an error position detection means for making correspondence between the irradiation positions detected by the irradiation position detection means and the amounts of the reflected laser beams detected by the beam receiving means, comparing the amounts of the reflected laser beams for the respective irradiation positions, and detecting an irradiation position at which an intensity of the laser beams is nonuniform in the target region.

According to this aspect, the irradiation position in the target region at which the irradiation intensity is not uniform is detected by comparing the amounts of laser beams reflected from target region for the respective irradiation positions. Accordingly, it is possible to smoothly detect the nonuniformity of the laser beams irradiated over the target region. Further, according to this aspect, the beam irradiation device can have a simple configuration because any particular component is not necessary other than regular components that are normally required for a beam irradiation device. In addition, according to this aspect, the beam receiving means is optically separated from the scan means, and accordingly, the laser beams reflected into an interior of the beam irradiation device through the output window cannot leak into the beam receiving means. Thus, it is possible to eliminate an influence of the noise due to the leaked beams unlike the technique described in the above Japanese Patent Application Laid-Open No. 2005-10094.

The beam irradiation device according to this beam irradiation device, the error position detection means compares a first amount of the reflected laser beams for a first irradiation position with a second amount of the reflected laser beams for a second irradiation position that is adjacent to the first irradiation position, and detects the second irradiation position as the irradiation position at which the intensity of the laser beams is nonuniform in the target region, when a ratio of the second amount of the reflected laser beams to the amount of the reflected laser beams is equal to or less than a predetermined ratio.

According to this configuration, the second irradiation position is detected as the irradiation position at which the intensity of the laser beams is nonuniform in the target region, when the ratio of the second amount of the reflected laser beams to the amount of the reflected laser beams is equal to or less than the predetermined ratio. Therefore, the irradiation position with decreased irradiation intensity may be smoothly and appropriately detected. The predetermined ratio may be set to around 50%, for example. In this case, it is possible to smoothly and appropriately detect the irradiation position at which the decrease in the irradiation intensity is relatively large due to dirt and such attached to the output window.

Further, the beam irradiation device according to this beam irradiation device, a notification means for notifying, based on a result of the detection by the error position detection means, that the intensity of the laser beams is nonuniform in the target region.

According to this aspect, it is possible to notify a user of the reduction in reliability of a beam irradiation operation. With this, safety in a driving operation may be maintained based on such as vehicle-to-vehicle distance detection.

Moreover, the beam irradiation device according to this beam irradiation device, a light source control means for controlling the light source to change the intensity of the laser beams to the irradiation position that has been detected by the error position detection means.

According to this aspect, it is possible to appropriately adjust the intensity of the laser beams for the irradiation position detected by the error position detection means. With this, the intensity of the laser beams may be made uniform.

As described above, according to the present invention, it is possible to provide a beam irradiation device capable of detecting nonuniformity of irradiation intensity of laser beams over a target region with a simple constitution. Further, a beam irradiation device capable of irradiating laser beams of a uniform amount over an entirety of the target region may be provided.

The scan means is realized by a lens actuator 300, an actuator driving circuit 40, a DAC 20, and a DSP control circuit 10 in an embodiment shown in FIG. 1, and by a polygon mirror 502, a motor 503, a motor driving circuit 41, the DAC 20, and the DSP control circuit 10 in an embodiment shown in FIG. 16.

Further, the irradiation position detection means is realized by a beam splitter 400, a converging lens 500, a PSD 600, a PSD signal processing circuit 60, an ADC 70, and the DSP control circuit 10 in the embodiment shown in FIG. 1, and by a rotation detection circuit 61 and the DSP control circuit 10 in the embodiment shown in FIG. 16.

Moreover, the beam receiving means is realized by a beam receiving portion 90 in an embodiment described below.

In addition, the error position detection means is realized by the DSP control circuit 10 in an embodiment described below.

Further, the notification means is realized by the DSP control circuit 10 in an embodiment described below.

Finally, the light source control means is realized by a laser driving circuit 30, the DAC 20, and the DSP control circuit 10 in an embodiment described below.

BRIEF DESCRIPTION OF THE DRAWINGS

The above-mentioned and other objects of the present invention and the novel features thereof will be completely more clear when the following descriptions of embodiments are read with reference to the accompanying drawings.

FIG. 12 is a flowchart for dirt detection operation according to the embodiment of the present invention;

DETAILED DESCRIPTION OF THE PREFERRED EMBODIMENT

Embodiments of the present invention will be described hereinafter with reference to the drawings.

Figure 1:
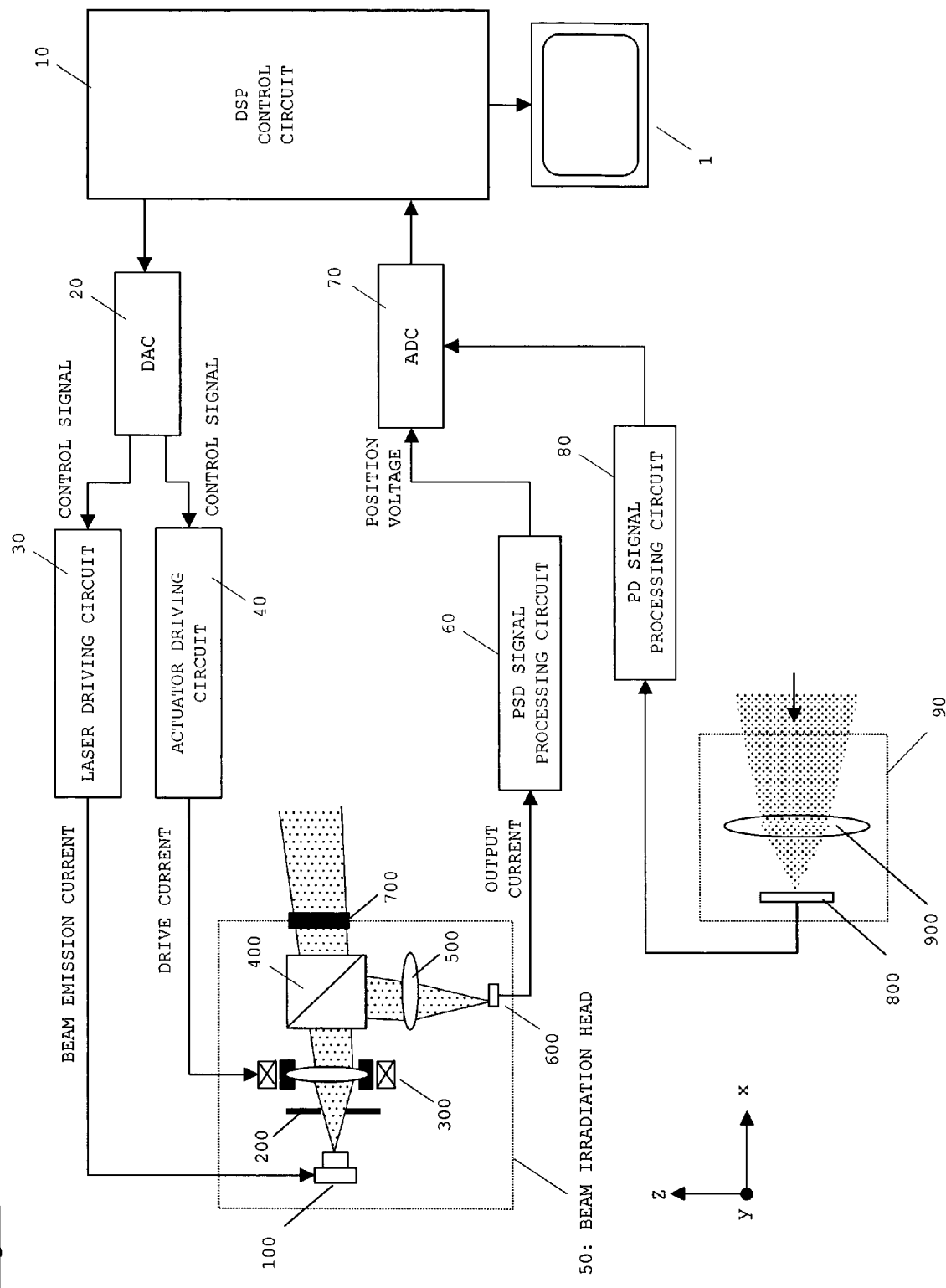
FIG. 1 shows a configuration of a beam irradiation device according to a embodiment of the present invention.

FIG. 1 shows the configuration of a beam irradiation device according to a first embodiment of the present invention.

As shown in FIG. 1, a beam irradiation device is provided with a digital signal processor (DSP) control circuit 10, a digital analog converter (DAC) 20, a laser driving circuit 30, an actuator driving circuit 40, abeam irradiation head 50, a position sensitive detector (PSD) signal processing circuit 60, an analog digital converter (ADC) 70, a photo detector (PD) signal processing circuit 80 and a beam receiving portion 90.

The DSP control circuit 10 outputs a digital signal for performing drive control of the laser driving circuit 30 and the actuator driving circuit 40 to the DAC 20. The DAC 20 converts the digital signal inputted from the DSP control circuit 10 into analog signals (control signals) and outputs the converted analog signals to the laser driving circuit 30 and the actuator driving circuit 40, respectively.

The laser driving circuit 30 drives a semiconductor laser 100 in the beam irradiation head 50 in accordance with the control signal inputted from the DAC 20. The actuator driving circuit 40 drives a lens actuator 300 in the beam irradiation head 50 in accordance with the control signal inputted from the DAC 20.

The beam irradiation head 50 irradiates laser beams with a target region set in a space in front of the beam irradiation device while performing a scan. As shown in FIG. 1, the beam irradiation head 50 is provided with the semiconductor laser 100, an aperture 200, the lens actuator 300, a beam splitter 400, a converging lens 500, a PSD 600, a beam receiving lens 700 and a photo detector 800.

Laser beams emitted from the semiconductor laser 100 are shaped into a desired shape by the aperture 200 and then allowed to impinge on an irradiation lens supported by the lens actuator 300. The irradiation lens is supported by the lens actuator 300 so as to be displaceable in the direction of a y-z plane of FIG. 1. Therefore, the laser beams that have passed through the irradiation lens change in outgoing angle in the direction of the y-z plane as the lens actuator 300 is driven. Thus, a laser beam scan on the target region is performed.

A part of the laser beams that have passed through the irradiation lens is reflected by the beam splitter 400 and separated from radiated laser beams (laser beams radiated onto the target region). The separated laser beams (separated beams) are converged onto the PSD 600 through the converging lens 500. The PSD 600 has a beam receiving face parallel to an x-y plane of FIG. 1 and outputs a current corresponding to a convergence position of the separated beams on the beam receiving face. The convergence position of the separated beams on the beam receiving face and the irradiation position of the radiated laser beams on the target region correspond to each other on one-to-one basis. Therefore, the current outputted from the PSD 600 corresponds to the irradiation position of the radiated laser beams on the target region. The construction and current outputting operation of the PSD 600 will be described later in detail with reference to FIGS. 5, 6A, and 6B.

An output current from the PSD 600 is inputted to the PSD signal processing circuit 60. Based on the inputted current, the PSD signal processing circuit 60 outputs a voltage signal indicating a convergence position of the separated beams to the ADC 70. The ADC 70 converts the inputted voltage signal into a digital signal and outputs the converted signal to the DSP control circuit 10. Based on the inputted voltage signal, the DSP control circuit 10 detects a convergence position of the separated beams on the beam receiving face.

Disposed in the DSP control circuit 10 are a table (scan table) for scanning the irradiation position of laser beams within the target region and a table (trajectory table) indicating a trajectory of the convergence position of separated beams on the beam receiving face when the laser beams are scanned according to the scan table.

In performing a laser beam scan operation, the DSP control circuit 10 outputs a signal for controlling the actuator driving circuit 40 to the DAC 20 while referring to the scan table.

At the same time, the DSP control circuit 10 detects a convergence position of separated beams on the beam receiving face based on a signal inputted from the ADC 70, compares the detected position with a desired convergence position prescribed in the trajectory table, and outputs a signal for controlling the actuator driving circuit 40 to the DAC 20 such that the detected position is drawn to the desired convergence position. Due to this servo operation, the radiated laser beams perform a scan within the target region in such a manner as to follow the trajectory prescribed in the scan table. The servo operation will be described later in detail with reference to FIG. 10.

Furthermore, in performing the laser beam scan operation, the DSP control circuit 10 outputs a signal for driving the semiconductor laser 100 to emit the laser beams in pulse shape (a rectangle) to the laser driving circuit 30 via the DAC 20. Here, "pulse shape" means that output of the semiconductor laser 100 is made a high level from zero level during a fixed period of time. Thus, the laser beams are emitted at the position of each block (refer to FIG. 7A) set in the shape of a matrix in the target region for a certain period of time.

At the same time, the DSP control circuit 10 monitors a convergence position of separated beams on the beam receiving face.

The beam receiving portion 90 receives the laser beams reflected by an obstacle or the like. The beam receiving portion 90 is provided with a photo detector (PD) 800 and a converging lens 900.

The laser beam reflected by the obstacle or the like is converged on the PD 800 through the converging lens 900. The PD 800 has a beam receiving face perpendicular to the X-Y plane of FIG. 1. The PD 800 outputs an electrical signal according to the amount of light income in the beam receiving face. A conventional type photo detector can be used as the PD 800.

The electrical signal from the PD 800 is input in the PD signal processing circuit 80. Based on the inputted current, the PD signal processing circuit 80 produces a voltage signal indicating the amount of reflected beams and outputs the produced electrical signal to the ADC 70. The ADC 70 converts the electrical signal inputted from the PD signal processing circuit 80 into digital signals and outputs the converted digital signals to the DSP control circuit 10.

The DSP control circuit 10 detects the amount of reflected beams on the beam receiving face based on the inputted voltage signal. Then the DSP control circuit 10 stores the detected amount in a reflected laser beam amount table (described later) by making the detected amount correspondent to the irradiation position of the radiated laser beams at this time.

The DSP control circuit 10 is provided with a table (emitted laser beam amount table) in which irradiation positions of radiated laser beams on the target region and amounts of the radiated laser beams at the respective irradiation positions are made correspondent. Here, the irradiation positions are respective blocks set in matrix in the target region (see FIG. 7A). In the emitted laser beam amount table, a default amount of radiated laser beams for each irradiation position is set by default. The amount of radiated laser beams for each block position is then sequentially updated in accordance with an adjustment process of the radiated laser beams, which will be described later.

Further, the DSP control circuit 10 is provided with the table (reflected laser beam amount table) in which the irradiation positions of radiated laser beams on the target region and amounts of reflected beams detected according to the emitted laser beam amount table when the respective positions are irradiated with the radiated laser beams. Here, the irradiation positions are respective blocks set in matrix in the target region (see FIG. 7A), as in the case of the emitted laser beam amount table. Each irradiation position is detected based on the convergence position of the separated beams on the PSD beam receiving face. In the reflected laser beam amount table, a default amount of reflected laser beams for each irradiation position is set by default. The amount of reflected laser beams for each block position is then sequentially updated in accordance with the amount of reflected laser beams for the each block position that is detected during the scan operation.

The DSP control circuit 10 detects the nonuniformity in the amounts of radiated laser beams in the target region, for example, during such as the scan operation by the laser beams in a manner described later, with reference to the reflected laser beam amount table. The DSP control circuit 10 then notifies a user of the detection results via an external display apparatus 1. Alternately, based on the detection results, the DSP control circuit 10 outputs, to the DAC 20, signals for controlling the output of the laser beams to be irradiated from the semiconductor laser 100, so as to make the amount of radiated laser beams in the target region uniform.

Figure 2:
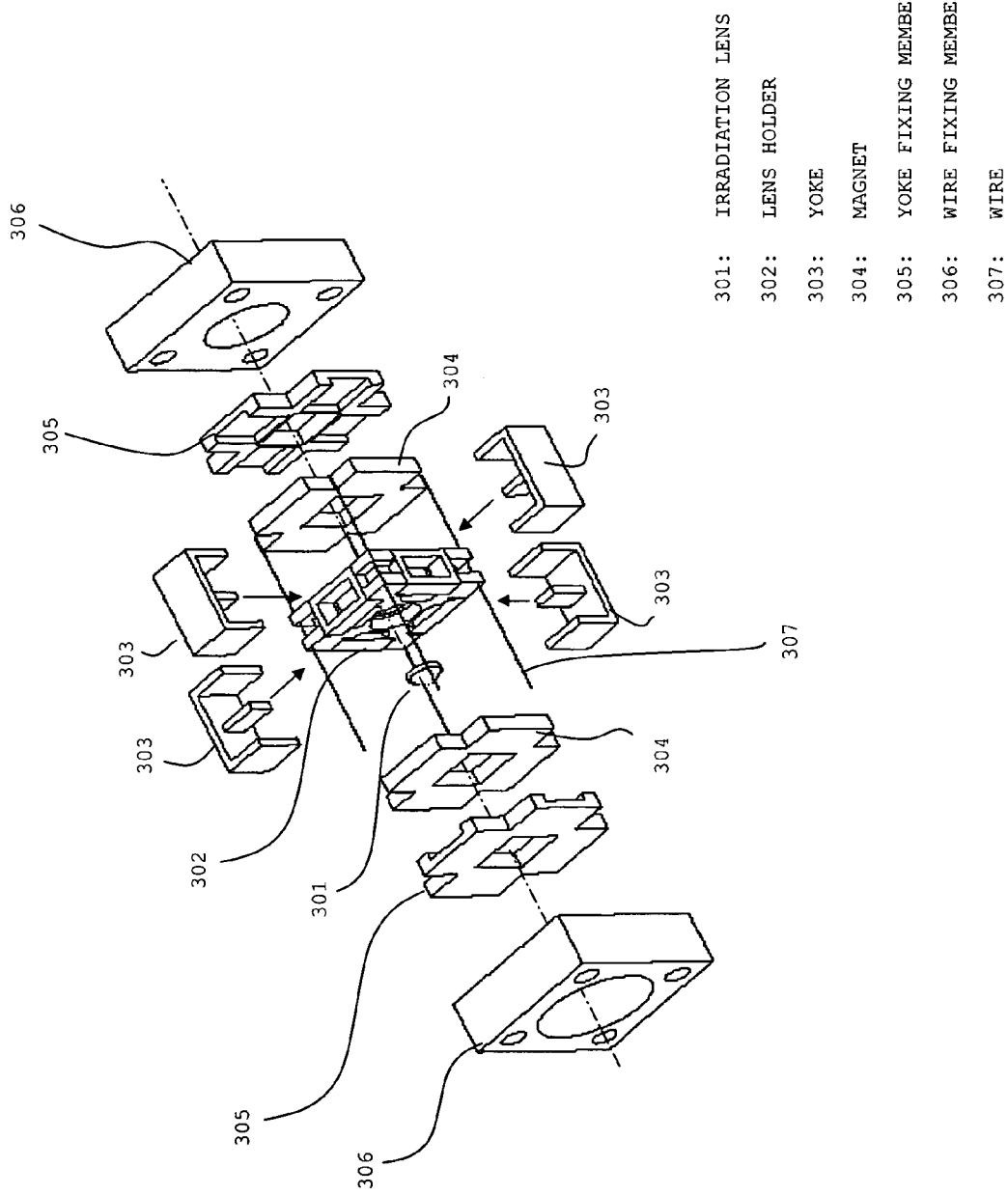
FIG. 2 shows a construction of a beam irradiation head according to the embodiment of the present invention.
Figure 3:
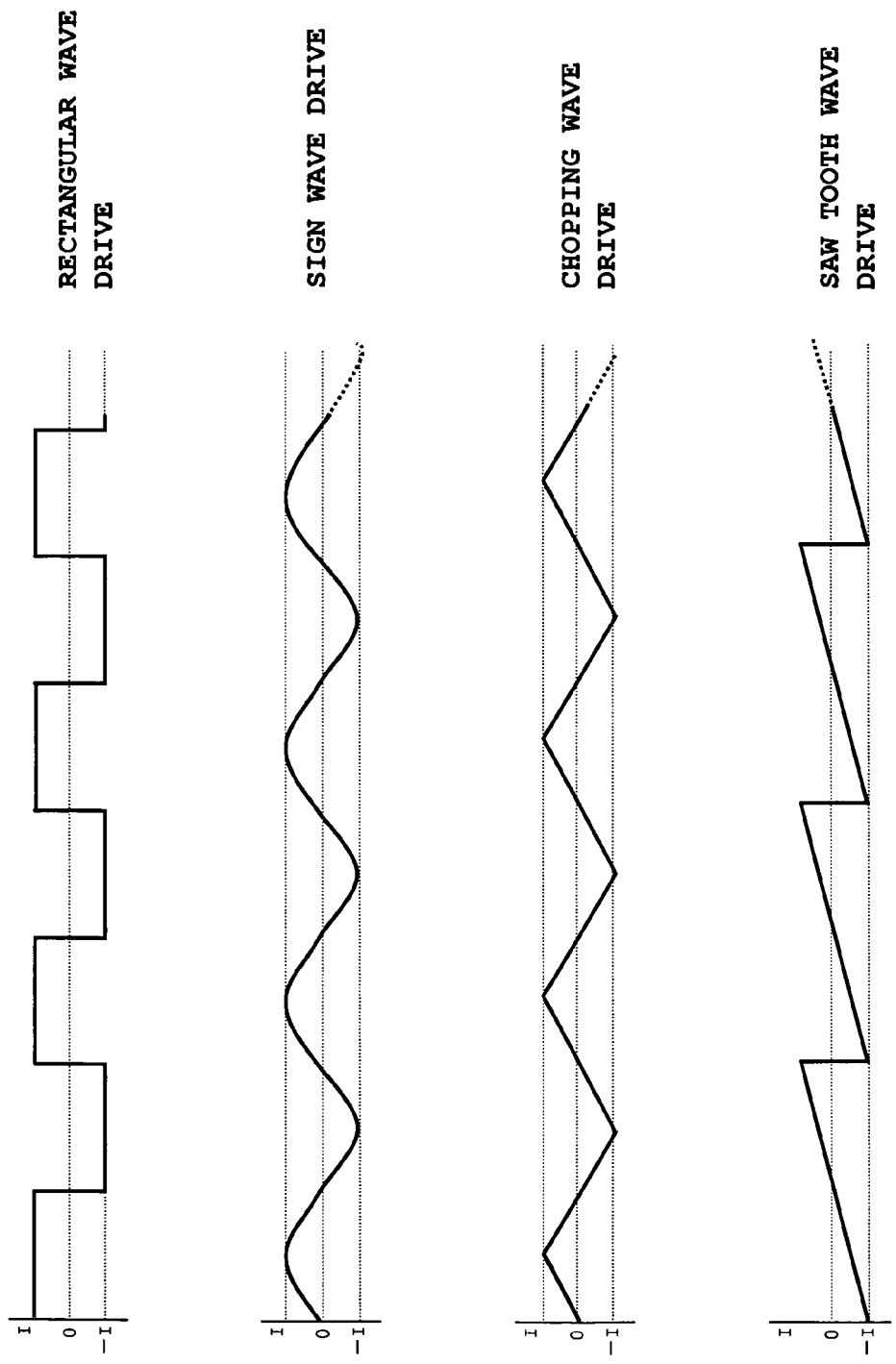
FIG. 3 shows an example of VCM driving electric current according to the embodiment of the present invention.

FIG. 2 shows the construction of the lens actuator 300 (an exploded perspective view).

Referring to FIG. 2, an irradiation lens 301 is fitted in a central opening of a lens holder 302. Coils are fitted on four lateral faces of the lens holder 302, respectively. Central protruding portions of yokes 303 are inserted into the coils respectively as indicated by arrows shown in FIG. 2. Tongue strips of each of the yokes 303 on both sides are fittingly inserted into corresponding depressed portions of a pair of yoke fixing members 305. In addition, magnets 304 are secured to the yoke fixing members 305 respectively such that the tongue strips of the yokes 303 are sandwiched therebetween. In this state, the yoke fixing members 305 accompanied with the magnets 304 are mounted on a base (not shown).

Moreover, a pair of wire fixing members 306 is mounted on the base. The lens holder 302 is resiliently supported by the wire fixing member 306 via wires 307. Holes for fittingly inserting the wires 307 therethrough are formed through the lens holder 302 at its four corners. After the wires 307 have been fittingly inserted through the holes, respectively, both ends of each of the wires 307 are secured to the wire fixing members 306, respectively. Thus, the lens holder 302 is resiliently supported by the wire fixing members 306 via the wires 307.

At the time of driving, drive signals are supplied from the actuator driving circuit 40 to the respective coils fitted to the lens holder 302. Thus, an electromagnetic driving force is generated, so the irradiation lens 301 is two-dimensionally driven together with the lens holder 302.

A driving signal (VCM driving electrical current) which is output from the actuator driving circuit 40 above when the irradiation lens 301 is driven in a horizontal direction (the y direction of FIG. 1) can be a rectangular wave signal, a sign wave signal, a saw tooth wave signal, a chopping wave signal or the like.

When the driving signal is the rectangular wave signal, for example, the driving direction of the irradiation lens in the horizontal direction reverses according to the driving signal being replaced by +I from −I or by −I from +I. In this case, a drive pattern of actuator 300 becomes simple, and a movement stroke of laser beam in the horizontal direction can be adjusted by regulating width of pulse.

When the driving signal is the sign wave signal, the irradiation lens 301 is displaced in the first horizontal direction in the period when the drive signal goes to +I from −I and is displaced in the second horizontal direction opposite to the first horizontal direction in the period when the drive signal goes to −I from +I. In this case, followup ability of actuator 300 for the driving signal become well, and a movement stroke of laser beam in the horizontal direction can be adjusted by regulating width of pulse.

Likewise, when the driving signal is the saw tooth wave signal or the chopping signal, the movement stroke of laser beam in the horizontal direction can be adjusted by regulating a period of these waves.

Figure 4:
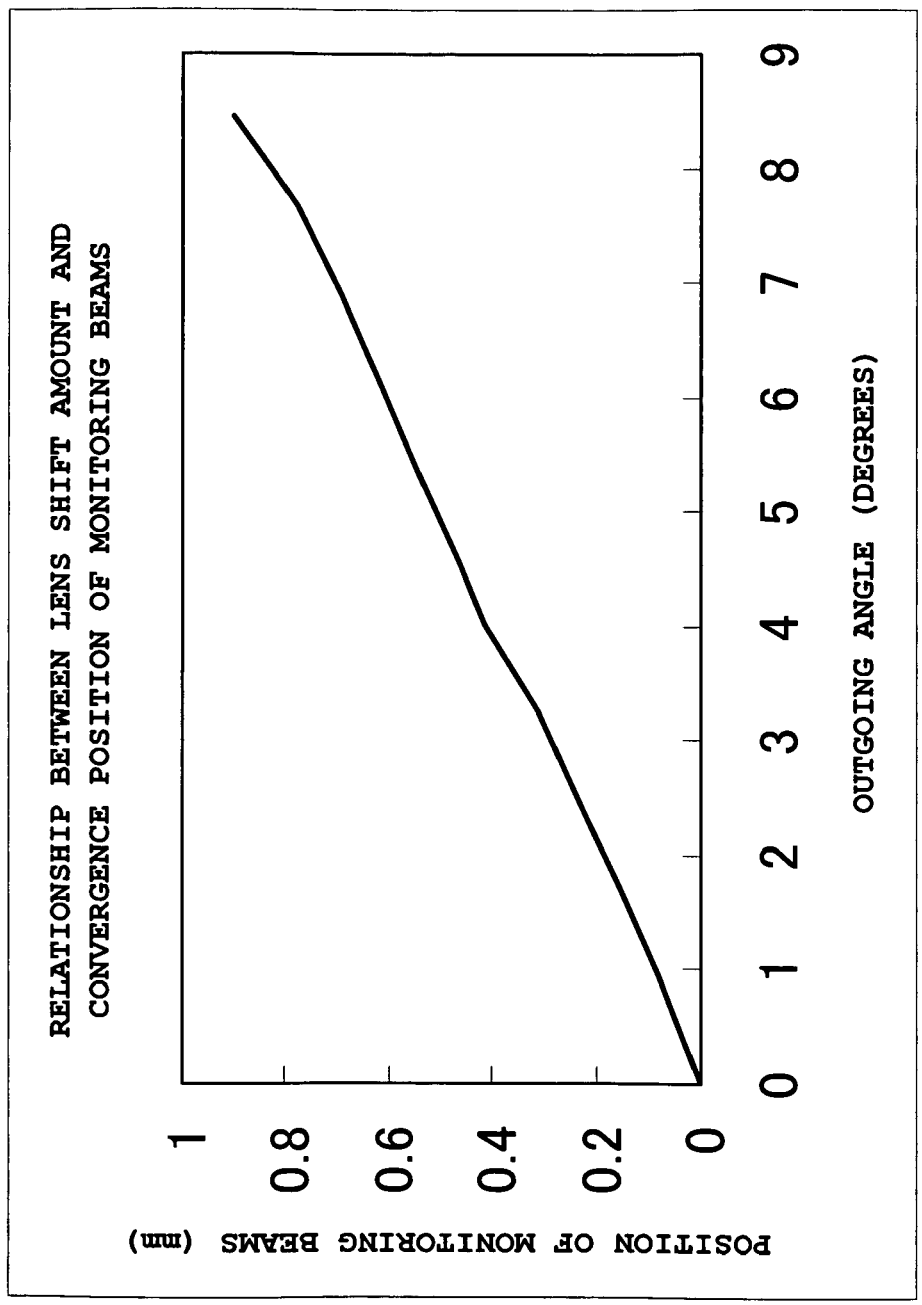
FIG. 4 shows a relationship between an outgoing angle of irradiated laser beams and a convergence position of separated beams according to the embodiment of the present invention.

FIG. 4 shows a relationship (simulation) between an outgoing angle of radiated laser beams and a convergence position of separated beams (referred to as monitoring beams of FIG. 4) on the beam receiving face of the PSD 800 at the time when the lens actuator 300 is driven to displace the irradiation lens 301 in one direction. As shown in FIG. 4, the displacement amount of the separated beams increases in proportion to the outgoing angle of the radiated laser beams. The characteristic shown in FIG. 4 is undulated because aberration is caused in the separated beams on the beam receiving face of the PSD 600 by two-dimensionally driving the irradiation lens 301.

Figure 5:
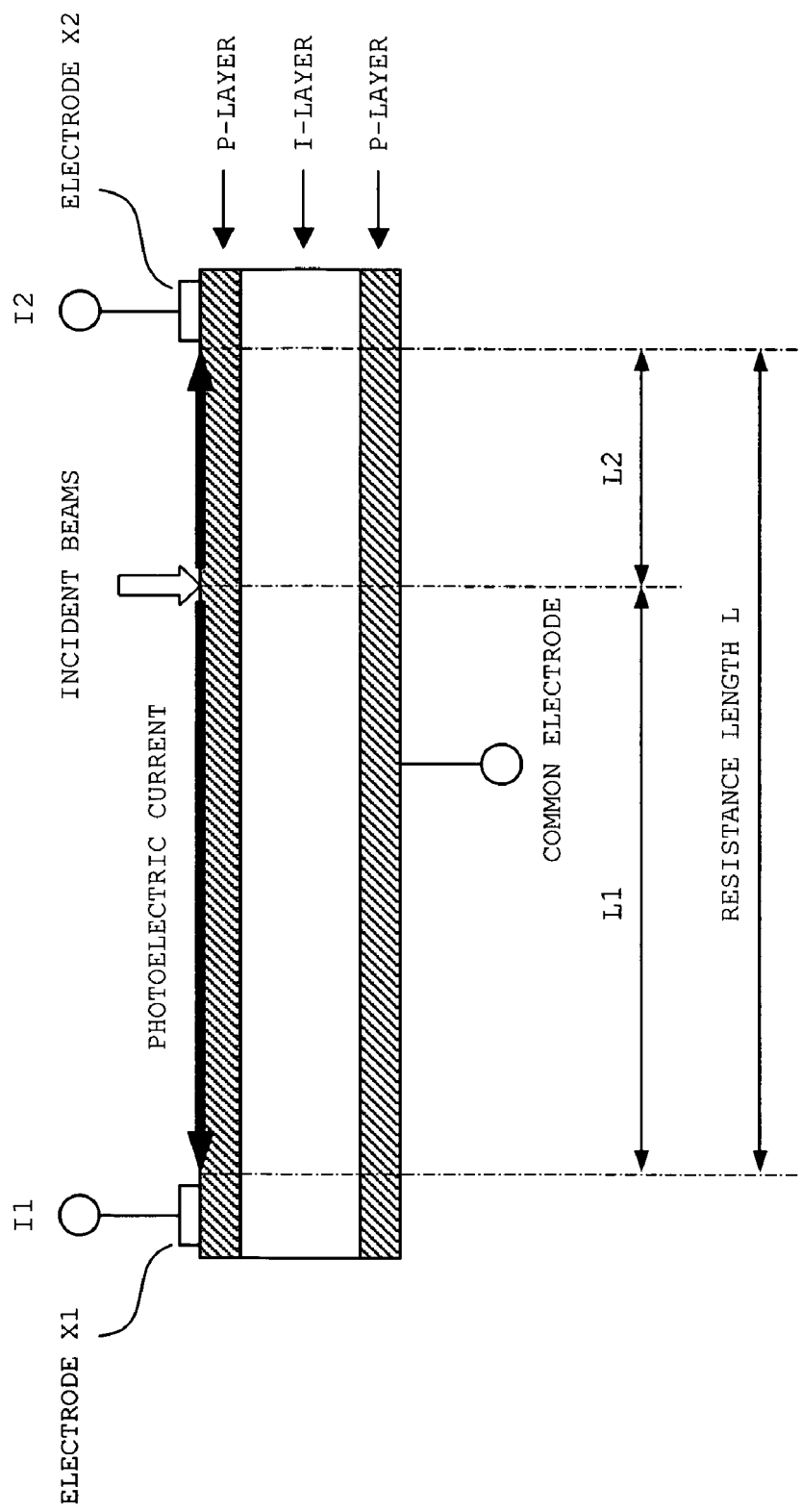
FIG. 5 shows a structure of a PSD according to the embodiment of the present invention.

FIG. 5 shows the structure of the PSD 600. Referring to FIG. 5, the structure of the PSD 600 is illustrated when viewed in a y-axis direction of FIG. 1.

As shown in FIG. 5, the PSD 600 is structured such that a P-type resistance layer serving as both a beam receiving face and a resistance layer is formed on the surface of an N-type high-resistance silicon substrate. Electrodes X1 and X2 for outputting a photoelectric current in an x-axis direction of FIG. 1 and electrodes Y1 and Y2 (not shown in FIG. 5) for outputting a photoelectric current in the y-axis direction of FIG. 1 are formed on the surface of the resistance layer. A common electrode is formed on a reverse face side of the resistance layer.

When separated beams are converged on the beam receiving face, an electric charge proportional to the amount of beams is generated on a convergence position. This electric charge reaches the resistance layer as a photoelectric current, which is divided into currents inversely proportional to the distances to the respective electrodes X1, X2, Y1, and Y2. Those currents are then outputted therefrom, respectively. The currents outputted from the electrodes X1, X2, Y1, and Y2 have magnitudes that are determined inversely proportional to the distances from the convergence position of the separated beams to the respective electrodes X1, X2, Y1, and Y2. Thus, the convergence position on the beam receiving face can be detected based on values of the currents outputted from the electrodes X1, X2, Y1, and Y2.

Figure 6B:
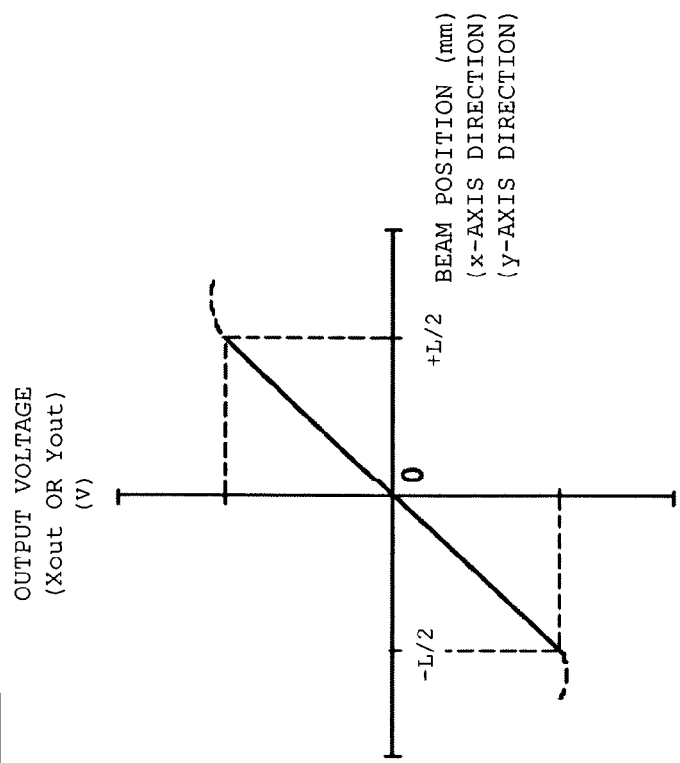
FIG. 6B is an explanatory view showing a variation in position detecting voltage detected by PSD according to the embodiment of the present invention.
Figure 6A:
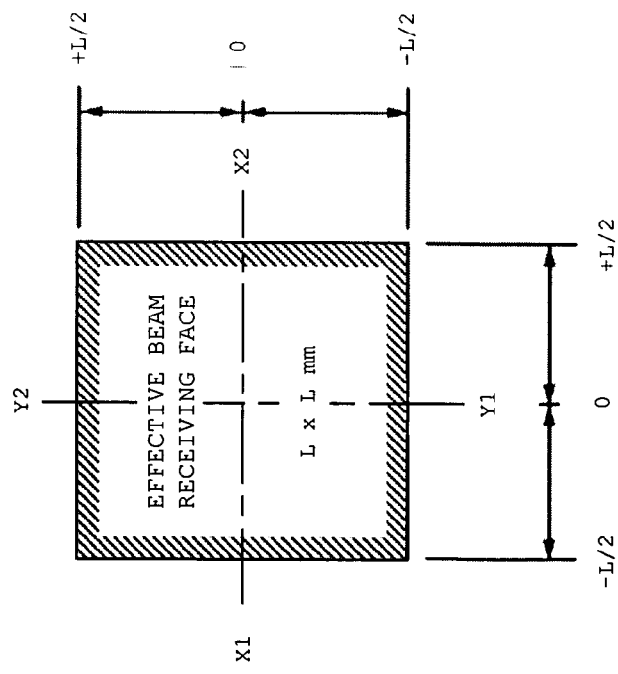
FIG. 6A is an explanatory view showing the structure of the PSD according to the embodiment of the present invention.

FIG. 6A is a view showing an effective beam receiving face of the PSD 600. FIG. 6B is a view showing a relationship between position detecting voltages generated in the PSD signal processing circuit 60 based on the currents outputted from the electrodes X1, X2, Y1, and Y2 and the convergence position of the separated beams on the effective beam receiving face. Referring to FIG. 6A, the effective beam receiving face is square. Given that a center position of the effective beam receiving face is a reference position (0 position), FIG. 6B shows a relationship between displacement amounts of the convergence position in the x-axis direction and the y-axis direction with respect to the reference position and an output voltage.

Based on the currents outputted from the electrodes X1, X2, Y1, and Y2, the PSD signal processing circuit 60 generates a voltage Xout corresponding to a displacement amount of the convergence position in the x-axis direction and a voltage Yout corresponding to a displacement amount of the convergence position in the y-axis direction, and outputs the voltage Xout and voltage Yout to the DSP control circuit 10 via the ADC 70. The DSP control circuit 10 detects the displacement amounts of the convergence position in the x-axis direction and the y-axis direction from the inputted voltages Xout and Yout, respectively.

A scan operation in this embodiment will be described with reference to FIGS. 7A, 7B, and 7C.

As shown in FIG. 14A, when the target region set in the space in front of the beam irradiation device is divided into blocks of 200 rows×3 lines, radiated laser beams are scanned so as to sequentially irradiate blocks. The radiated laser beams are irradiated to each block once. The sequence in which the blocks are scanned can be set arbitrarily. For example, as shown in FIG. 7B, a setting can also be made such that the blocks are sequentially scanned line by line starting from the one at the upper-left corner position. As described above, a scan trajectory (scan sequence) is prescribed in the scan table of the DSP control circuit 10.

Figure 7B:
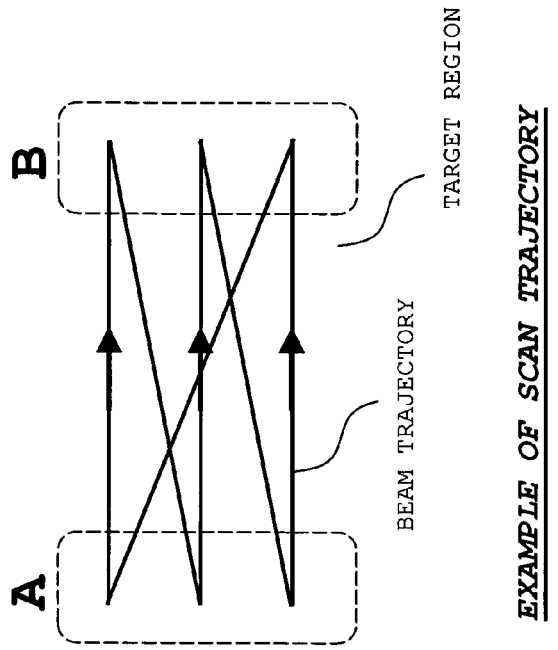
FIGS. 7A, 7B and 7C are explanatory views showing scan operation according to the embodiment of the present invention.
Figure 7C:
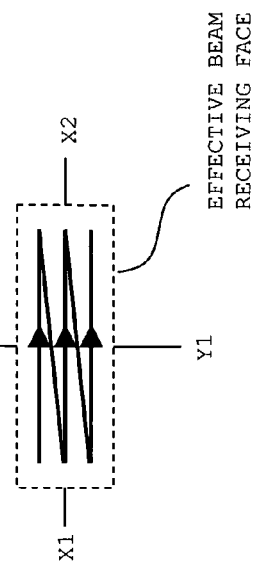
Figure 7A:
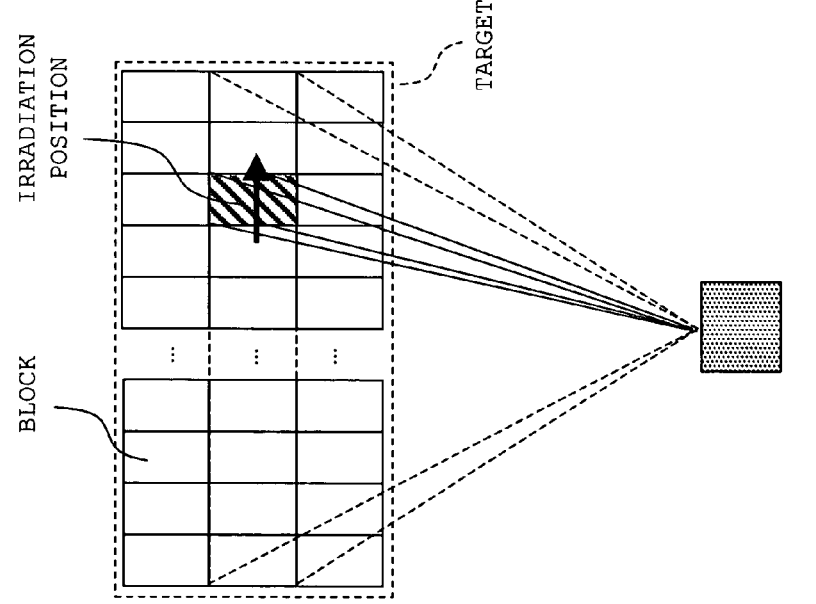

The convergence position of separated beams on the beam receiving face of the PSD 600 moves along a trajectory shown in FIG. 7C when a scan is performed as shown in FIG. 7B. The trajectory of FIG. 7C corresponds to the scan trajectory of FIG. 7B on one-to-one basis. Accordingly, the scan position of radiated laser beams can be identified from the convergence position on the trajectory of FIG. 7C. In this case, as described above, the trajectory of FIG. 7C complies with the trajectory table in the DSP control circuit 10.

In the scan operation shown in FIG. 7B, a scan speed is almost constant at a section excluding sections A and B in the drawing. However, in the sections A and B, that is, in the sections about where the moving direction of the actuator 300 changes, the scan speed changes either gradually accelerating, or gradually slowing down. Accordingly, if the laser beam emission is pulsed at a constant cycle, a problem arises that a position for the laser beam emission deviates from a corresponding block, which prevents the laser beams from irradiating at each block correctly, especially in the sections A and B.

Figure 8:
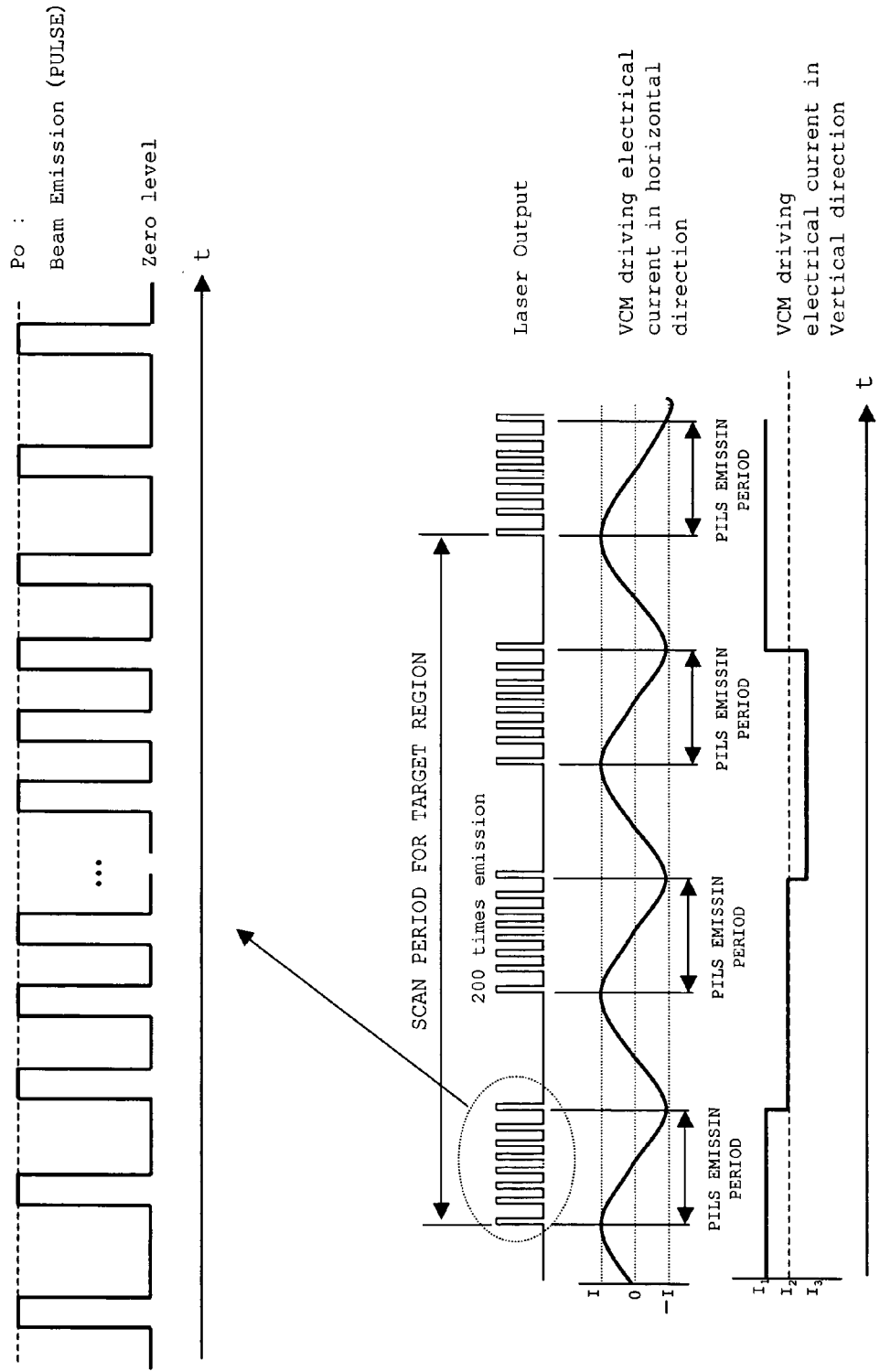
FIG. 8 shows a relationship between the VCM driving electric current and emission timing according to the embodiment of the present invention.

Therefore, in the present embodiment, as shown in FIG. 8, pulsed emission is performed at a variable time interval so that a scan distance between one pulse emission and the next pulse emission becomes constant through the sections A to B. With this, the laser beams are irradiated correctly, once for each block.

At this time, by using the sign wave signal, as shown in FIG. 8, as the driving signal in horizontal direction (VCM driving electrical current in horizontal direction) that is inputted from the actuator driving circuit 40 to the actuator 300, it is possible to increase the followup ability of the actuator 300 to the driving signal, and a stable scan operation can be realized.

Figure 9:
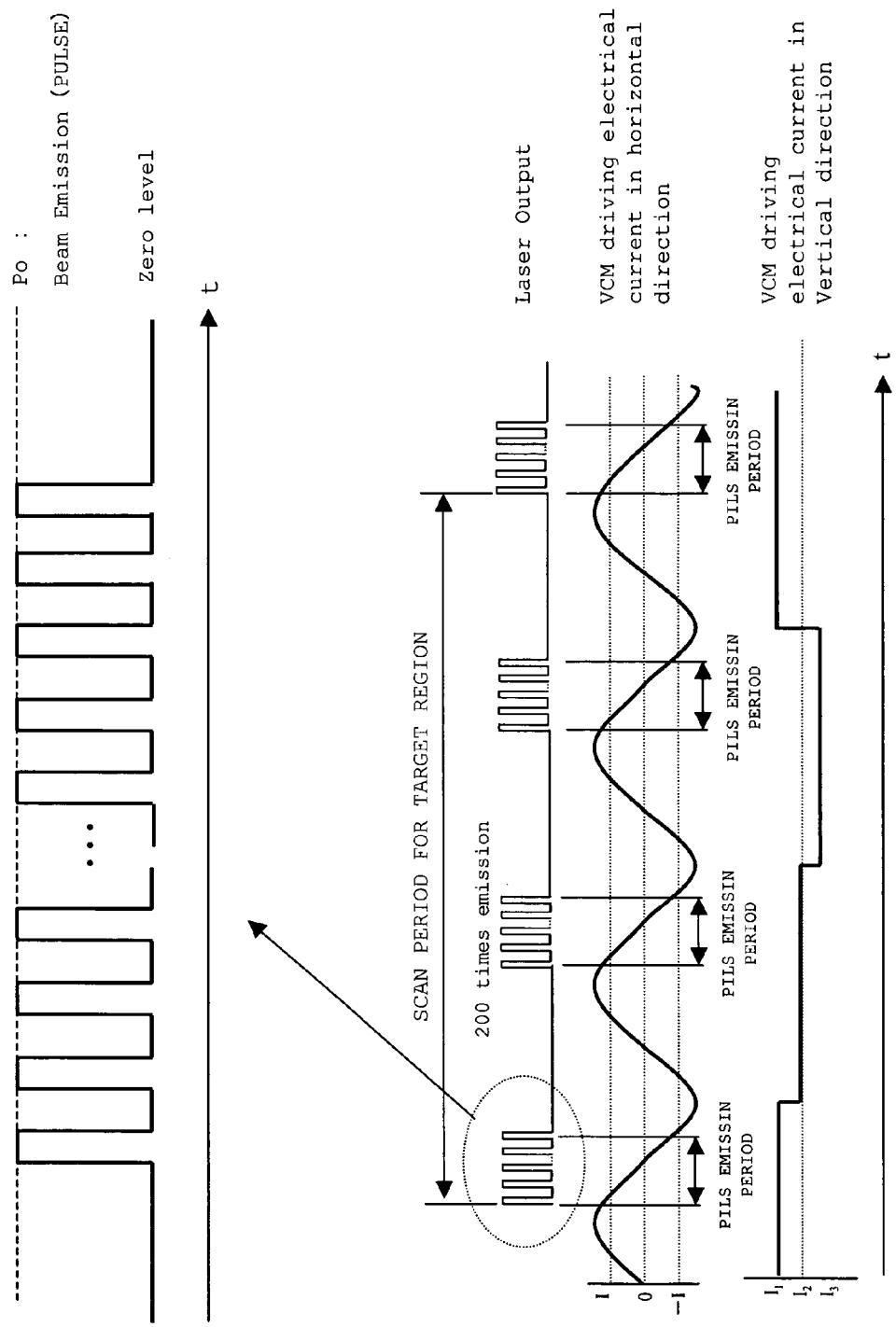
FIG. 9 shows a relationship between the VCM driving electric current and emission timing according to the embodiment of the present invention.

In the example shown in FIG. 8, a period during which the VCM current in horizontal direction goes down to −I from +I is a pulse emission period. Instead of this example, as shown in FIG. 9, it is possible to set the pulse emission period as a period during which the change in the VCM current is almost in a straight line out of the period during which the VCM current in horizontal direction goes down to −I from +I. With this, the scan speed of the actuator 300 is almost constant through the sections A to B in FIG. 7B. In this case, accordingly, it is possible to make the width of the pulse of laser beams to be isochronous.

In FIGS. 8 and 9, each pulse emission period corresponds to a scan period in horizontal direction of the target region. Further, a period during which the sign wave signal rises from a minimum value to a maximum value corresponds to a period during which the radiated laser beams moves from a right end to a left end of the target region.

In the beam irradiation device, it is most ideal that radiated laser beams are scanned along the scan trajectory shown in FIG. 7B. However, since the beam irradiation device usually undergoes undesired vibrations, disturbances, and the like, the scan position of the radiated laser beams deviates from a desired scan trajectory. In this case, the convergence position of the separated beams on the beam receiving face also deviates from the trajectory shown in FIG. 7C in accordance with the deviation of the scan position. To correct this, the DSP control circuit 10 controls the actuator driving circuit 40 such that a scan position of the radiated laser beams follow the desired scan trajectory.

Figure 10:
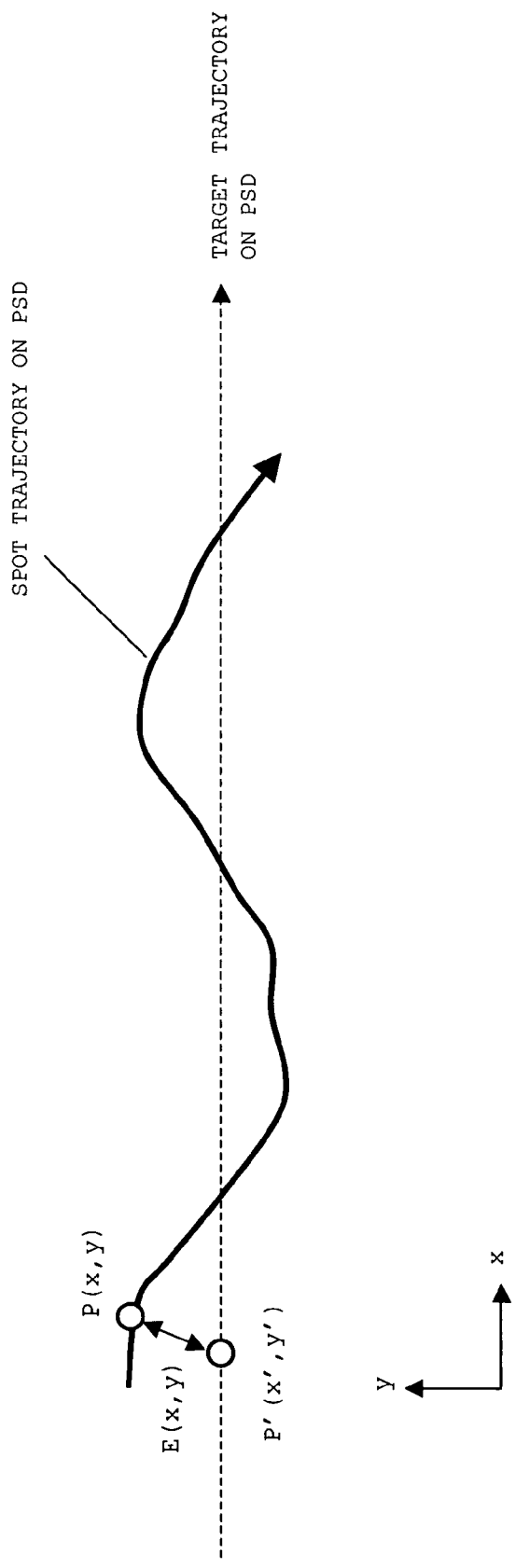
FIG. 10 is an explanatory view showing a method of applying trajectory servo according to the embodiment of the present invention.

FIG. 10 shows an example of a spot trajectory of separated beams on the effective beam receiving face. In this case, as described above, the DSP control circuit 10 supplies a servo signal to the actuator driving circuit 40 so that the convergence position of the separated beams is drawn to the target trajectory.

It is now assumed that the convergence position of separated beams is P(x, y) and that the convergence position to be located on the target trajectory is P'(x', y') at this moment. The convergence position P'(x', y') on the target trajectory is acquired from the trajectory table set in the DSP control circuit 10. More specifically, the convergence position corresponding to the scan position of radiated laser beams is acquired from the trajectory table.

In this case, the DSP control circuit 10 calculates Ex=x-x' and Ey=y-y' based on P(x, y) and P'(x', y') and supplies a servo signal to the actuator driving circuit 40 based on a calculation result such that both Ex and Ey become equal to 0. Thus, the scan position of radiated laser beams is drawn back toward a scan position to be located on the scan trajectory at this moment. In response to this, the convergence position of separated beams is also drawn toward the convergence position P'(x', y') to be located on the target trajectory at this timing. Due to this servo operation, the radiated laser beams are scanned so as to follow the desired scan trajectory.

Figure 11:
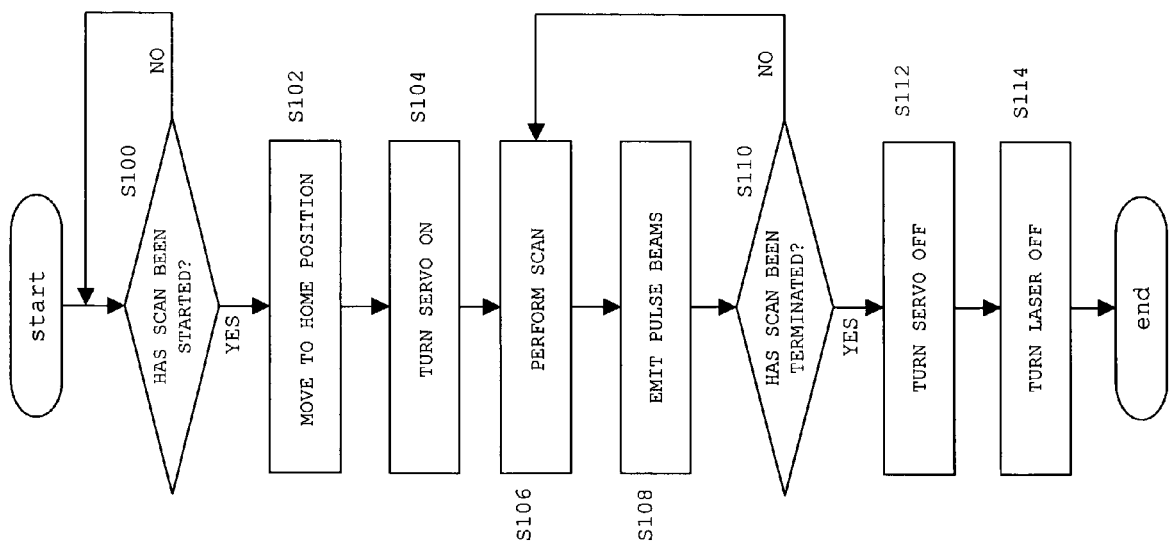
FIG. 11 is a flowchart for the scan operation according to the embodiment of the present invention.

FIG. 11 shows a flowchart in performing the scan operation.

When the scan operation is started in S100, the irradiation position of radiated laser beams is shifted to a home position in S102. The home position is set to, for example, a position of a leftmost and uppermost one of the blocks shown in FIG. 6B. Furthermore, after a trajectory servo for the radiated laser beams has been turned ON in S104, the scan is performed in S106. Then, the radiated laser beams are irradiated for the target region in S108. At this moment, the detection device on which the beam irradiation device is mounted performs processing of measuring an obstacle, measuring a distance, etc. by receiving beams reflected from the target region.

After that, it is determined in S110 whether or not the scan operation has been terminated. When the scan operation has not been terminated, a processing returns to S106 to repeat the aforementioned scan operation. On the other hand, when the scan operation has been terminated, the trajectory servo is turned OFF in S112 and then the semiconductor laser 100 is turned OFF in S114.

Next, the following describes various processings using the amount of reflected laser beams.

First, an update processing of the reflected laser beam amount table is explained. This processing is performed during the scan operation shown in FIG. 11. The update processing is performed by the DSP control circuit 10.

In addition to the scan operation in S106 and the laser beam emission operation in S108 shown in a flowchart shown in FIG. 11, the DSP control circuit 10 measures the beams received with the beam receiving portion 90, that is, the amount of reflected beams from the target region, for each block. Then, the DSP control circuit 10 stores the measured amount of reflected beams in the reflected laser beam amount table for the each block position.

Thus, the measurement of the amounts of reflected beams and the storing of the measured amounts are performed for all of the blocks on the target region. By this, updating of the reflected laser beam amount table is completed. The update of the reflected laser beam amount table is performed every time the target region is scanned. In general, the detection of the amount of reflected beams occurs at a block corresponding to a position of the obstacle. Accordingly, a value corresponding to the amount of reflected beams is stored for the block corresponding to the position of the obstacle, and a value of zero or close to zero is stored in other blocks.

Next, a dirt detection processing is explained. This processing is performed concurrently with the update of the reflected laser beam amount table. Here, a single routine is executed while repeating the update of the reflected laser beam amount table for a predetermined number of times. The dirt detection processing is performed by the DSP control circuit 10.

FIG. 12 is a flowchart showing steps of the dirt detection processing.

Upon starting of the dirt detection processing, first, it is determined whether the reflected laser beam amount table has been updated in S200. Here, when the reflected laser beam amount table has been updated, one of the blocks set on the target region is set as a reference block in S202. Then, in S204, an amount of reflected laser beams P0 of the reference block is obtained from the reflected laser beam amount table.

Next, in S206, it is determined whether the amount of reflected beams P0 of the reference block is equal to or greater than a threshold level Ps. This step is provided in order to avoid the dirt detection by error. In other words, as described above, when there is no obstacle at a position corresponding to the reference block, the amount of reflected beams is either not present at all or very small close to zero at the position of the reference block. Performing the dirt detection based on such an unstable amount of reflected beams could possibly result in inappropriate dirt detection. Therefore, when it is determined in S206 that P0<Ps, the processing returns to S202 skipping subsequent steps, and a different block is set as a next reference block. Note that the threshold level Ps is set at a level appropriate for detecting the amount of reflected beams from the target region.

Figure 13:
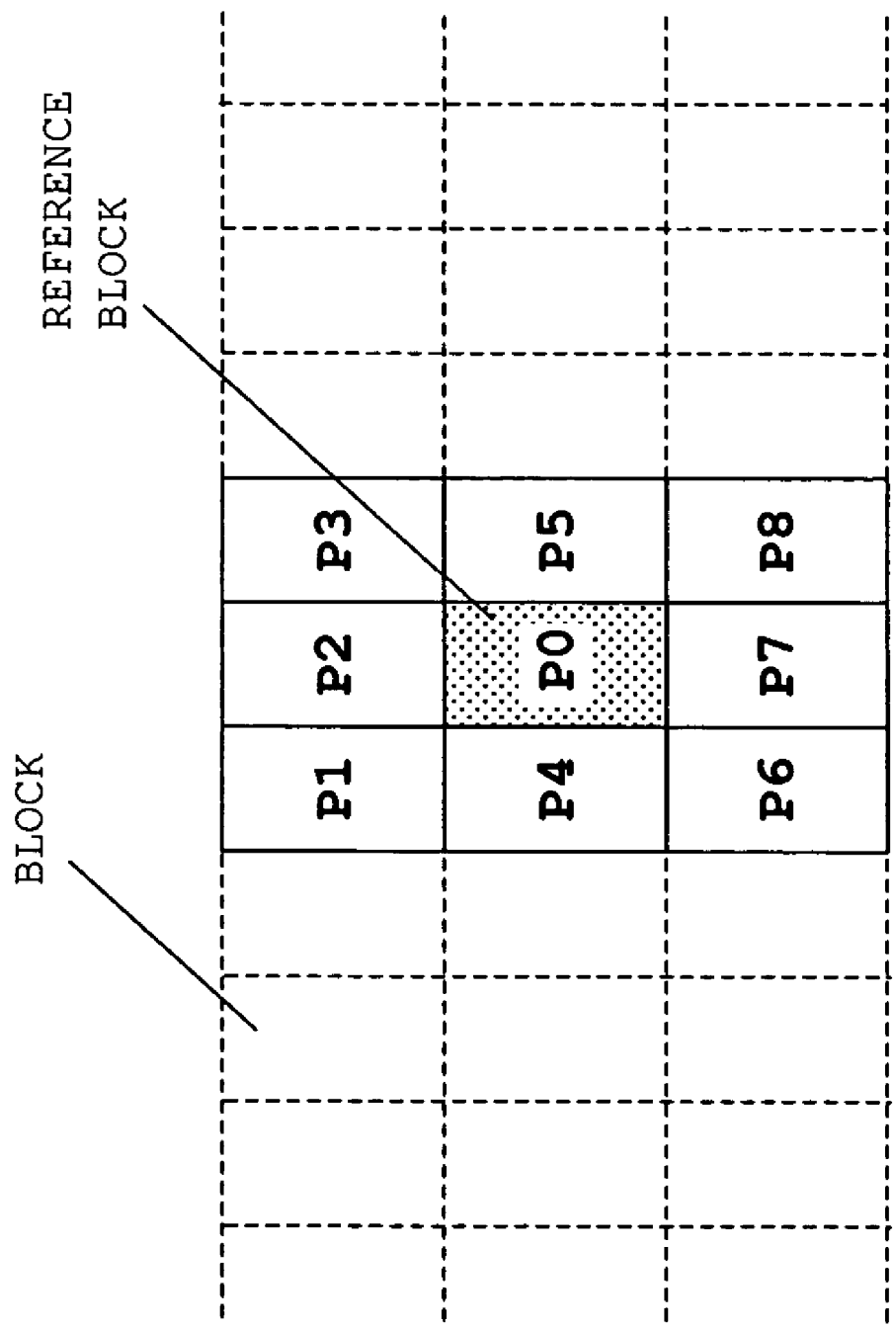
FIG. 13 is an explanatory view showing dirt detection processing according to the embodiment of the present invention.

When it is determined in S206 that P0≧Ps, next obtained are amounts of reflected beams of blocks adjacent to the reference block from the reflected laser beam amount table in S208. For example, in a case where 8 blocks are adjacent to the reference block as shown in FIG. 13, amounts of reflected beams P1 to P8 of these 8 blocks are obtained. Further, in S210, any amount that is equal to or greater than the threshold level Ps is extracted from the obtained amounts of reflected beams. Like S206 described above, this step is provided in order to avoid the dirt detection by error. When it is not possible to extract an amount that is equal to or greater than the threshold level Ps in S210, the processing returns to S202.

After this, a ratio Rk of each amount of reflected laser beams extracted in S210 to the reflected laser beams of the reference block is calculated in S212. In the example of FIG. 13, for example, in a case where all of the amounts of reflected beams P1 to P8 of the 8 blocks that are adjacent to the reference block are equal to or greater than the threshold level Ps, the calculation results in S212 are P1/P0, P2/P0, P3/P0, P4/P0, P5/P0, P6/P0, P7/P0, and P8/P0. In other words, the ratio Rk of an amount of reflected beams Pk of an adjacent block to the amount of reflected beams P0 of the reference block is calculated by Rk=Pk/P0.

After the ratios Rk are thus calculated, each ratio is compared with the threshold value Rs in S214. Here, the threshold value Rs is set to about 0.5, for example. Then, in S216, any block having the ratio Rk that is equal to or smaller than the threshold value Rs among the blocks adjacent to the reference block is added by 1 point to rating that indicates possibility of dirtiness (hereinafter referred to as "dirt rating"). In a case where any of the ratios Rk calculated in S212 is not equal to or smaller than the threshold value Rs, S216 is skipped.

After the above-described calculation of the dirt rating, it is determined in S218 whether all of the blocks on the target region have been set as the reference block. If there is a block that has yet not been set as the reference block (S218: N), the processing returns to S202, and a next block is set as a next reference block. Then, the same steps are performed as described above based on the amounts of reflected beams of this reference block and blocks adjacent thereto. The steps from S202 to S216 are repeated until all of the blocks on the target region are set as the reference block.

After all of the blocks on the target region are set as the reference block, next, in S220, it is determined whether the number of update of the reflected laser beam amount table reaches a predetermined value Ns. Here, if the number of update has not reached the Ns, the processing returns to S200 and waits for the reflected laser beam amount table to be updated. Then, upon update of the reflected laser beam amount table, the steps from S202 to S218 are performed for the reflected laser beam amount table after the update. The steps from S200 to S218 are repeated until the number of update of the reflected laser beam amount table reaches Ns. With this, points are added to the dirt rating of each block.

Thus, once the number of update of the reflected laser beam amount table reaches Ns (S220: Y), a reference value Dr is set based on the dirt rating of all blocks. The reference value Dr may be, for example, an average value of the dirt rating of all blocks, an average value of a largest value and a smallest value of the dirt rating, or a value derived by the largest value of the dirt rating multiplied by a constant fraction. Here, in a case where the largest value or the average value of the dirt rating does not exceed a constant value, a default value may be set as the reference value Dr. Alternately, the reference value Dr set by default may be used, without setting the reference value Dr based on the dirt rating of all blocks as described above. In this case, S222 is skipped.

After thus setting the reference value Dr, next in S224, a value of the dirt rating for each block is compared with the reference value Dr. Then, in S226, any block whose value of dirt rating is equal to or greater than the reference value Dr is set as a block with dirt (hereinafter referred to as "dirt block"). At the same time, in S228, a notification that the output window 700 has dirt thereon is displayed on a display unit (not depicted in the drawings). With this, the dirt detection routine is completed. The notification that the output window 700 has dirt may be outputted as sound instead of the display in S228.

Although the steps from S216 to S226 are provided in the routine shown in FIG. 12, these steps may be skipped. Specifically, if there is any block, among the blocks adjacent to the reference block, whose ratio Rk is equal to or smaller than the threshold value Rs in S214, it may be immediately determined that the block corresponding to the amount of reflected beams Pk is a dirt block, and the notification of dirt can be outputted. However, in this case, the possibility that a block located near the position of the obstacle is determined as the dirt block by error increases compared to the previously explained case. In order to suppress such a detection by error, it is preferable to perform the steps from S216 to S226 to determine the dirt on a block based on the dirt rating for the block stored over a given period of time.

Figure 14:
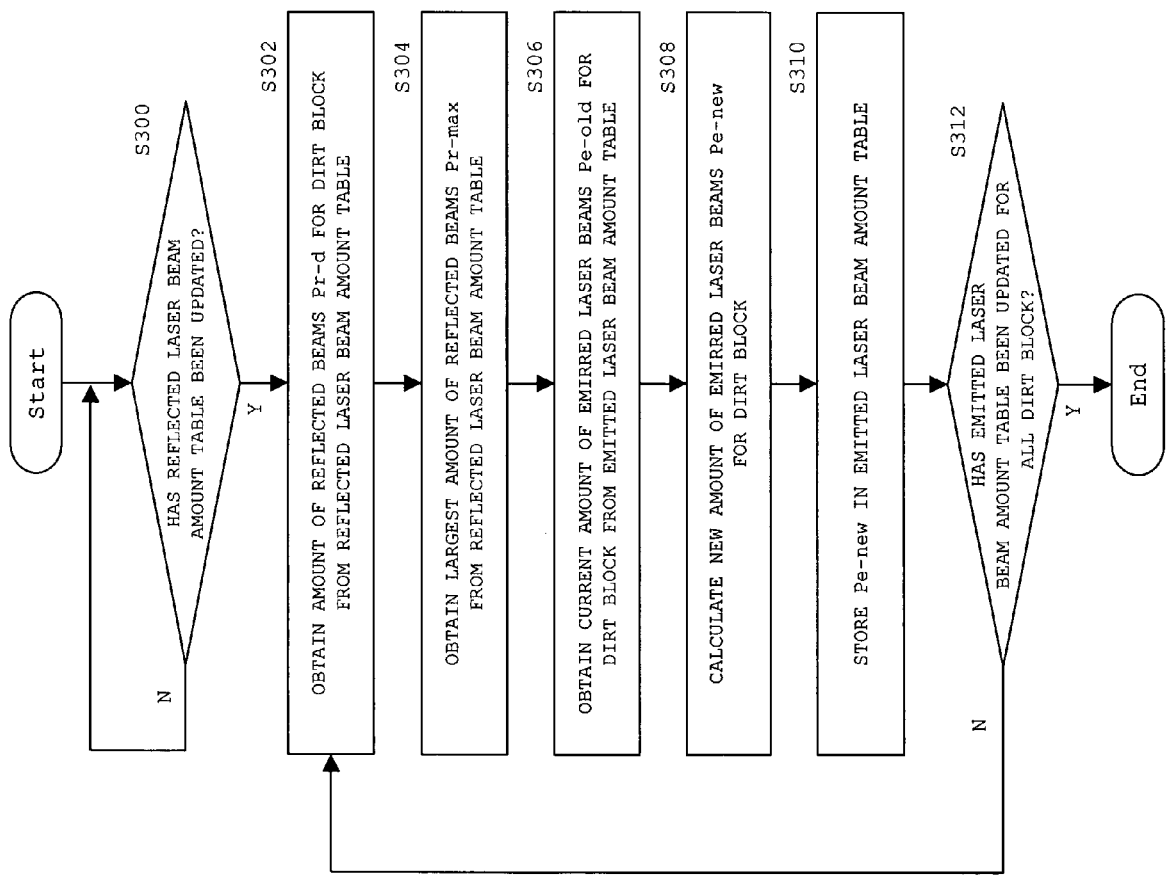
FIG. 14 is a flowchart for emission power correcting operation according to the embodiment of the present invention.

FIG. 14 shows steps for an emission power correcting processing for correcting the power of the laser beam emission. This processing is performed in response to the detection of the dirt block in the processing shown in FIG. 12. This processing is performed by the DSP control circuit 10.

As described above, when the operation shown by the flowchart of FIG. 11 is executed after the dirt block is detected in the processing in FIG. 12, the amount of reflected beams from the target region is measured for each block, and the measured amount is stored in the reflected laser beam amount table for each block position.

After it is determined that the reflected laser beam amount table has been updated in S300, an amount of reflected beams Pr-d for the dirt block detected in the processing of FIG. 12 is obtained from the reflected laser beam amount table in S302.

Further, a largest amount of reflected beams Pr-max among the amounts of reflected beams for all blocks is obtained from the reflected laser beam amount table in S304. In addition, a current amount of emitted laser beams Pe-old for the dirt block is obtained from the emitted laser beam amount table in S306.

Next, in S308, Pe-new=(Pr-max/Pr-d)*Pe-old is calculated. Then, the calculated Pe-new is set as a new amount of emitted laser beams for the dirt block in the emitted laser beam amount table (S310). After this, in S312, it is determined whether the emitted laser beam amount table has been updated for all of the dirt blocks. If there is a dirt block for which the emitted laser beam amount table is to be updated, the processing returns to S302, and the update processing of the amount of emitted laser beams for a next dirt block is performed. As described above, when the update of the emitted laser beam amount table for all of the dirt blocks is completed (S312), the correction processing ends. After this, each block is irradiated with the radiated laser beams by referring to the updated emitted laser beam amount table. With this, an intensity of the radiated laser beams irradiated to the dirt block increases, and intensities of the radiated laser beams irradiated over the target region becomes uniform.

As described above, according to the present embodiment, it is possible to detect the nonuniformity of the radiated laser beams irradiated over the target region with simple processings without fail. Further, the output of the radiated laser beams may be adjusted appropriately based on the detection results. Therefore, a stable scan operation can be realized even when undesired dirt and such is attached to the output window of the beam irradiation device.

Further, according to the present embodiment, as described above, the nonuniformity of the radiated laser beams can be detected while performing the normal scan operation. Therefore, a smooth scan operation can be realized. Moreover, according to the present embodiment, the beam irradiation device can have a simple configuration because any particular component is not necessary other than regular components that are normally required for a beam irradiation device.

In addition, according to the present embodiment, the beam irradiation head 50 and the beam receiving portion 90 are optically completely separated. Therefore, the radiated laser beams reflected into an interior of the beam irradiation device through the output window 700 cannot leak into the beam receiving portion 90. Thus, it is possible to eliminate an influence of the noise due to the leaked beams unlike the technique described in Japanese Patent Application Laid-Open No. 2005-10094.

The embodiment of the present invention is explained above. It goes without saying that the present invention is not limited to the aforementioned embodiment but may be subject to a variety of other modifications.

For instance, although servo is applied such that the convergence position P(x, y) of separated beams is drawn toward the convergence position P'(x', y') to be located on the target trajectory at the above-mentioned timing in the embodiment as described with reference to FIG. 10, the convergence position of separated beams can also be drawn onto the target trajectory through other servo processings.

Figure 15:
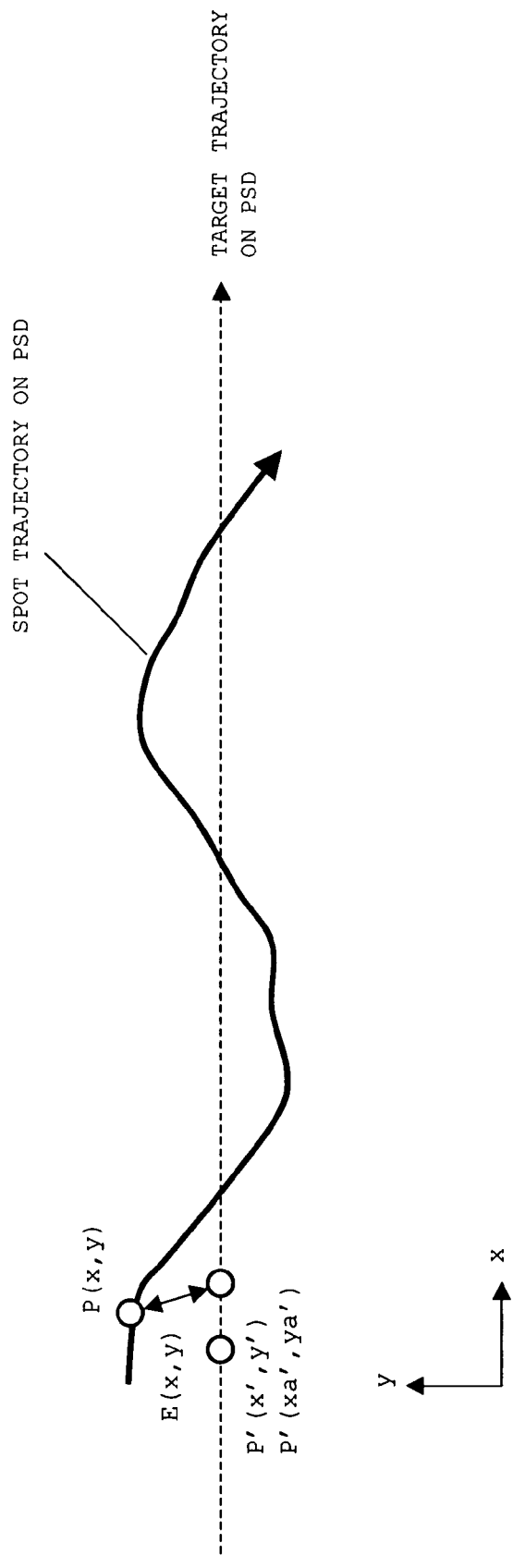
FIG. 15 is an explanatory view showing a method of applying trajectory servo according to the embodiment of the present invention.

For example, as shown in FIG. 15, the convergence position of separated beams can also be drawn toward a convergence position P'(xa', ya') to be located on the target trajectory after the lapse of ΔT from the above-mentioned timing. In this case, the DSP control circuit 10 calculates Ex=x-xa' and Ey=y-ya' based on P(x, y) and P'(xa', ya') and supplies a servo signal to the actuator driving circuit 40 based on a result of the calculation such that both Ex and Ey become equal to 0. In this manner, the scan position of radiated laser beams can be smoothly drawn toward a subsequently scheduled scan position. As a result, an efficient scan operation can be realized.

In the foregoing description, the scan position of radiated laser beams may sharply deviate from a desired scan position as a result of servo deviation when the beam irradiation device undergoes vibrations or disturbances of an inconceivable magnitude. In such cases, for example, in the scan mode shown in FIG. 7B, it is appropriate to return the scan position to the head position of a line that is being scanned at the time of the occurrence of servo deviation and to continue to perform the succeeding scan processings from that position.

If a so-called disturbance observer for predicting vibrations and disturbances is employed as well, the trajectory of radiated laser beams can be followed more smoothly. In this case, the occurrence of servo deviation can be effectively suppressed even when the beam irradiation device undergoes vibrations or disturbances of an inconceivable magnitude.

Further, in the above embodiment, the lens actuator 300 is employed the scan using the radiated laser beams. However, it is also possible to employ a scan mechanism using a polygon mirror instead.

Figure 16:
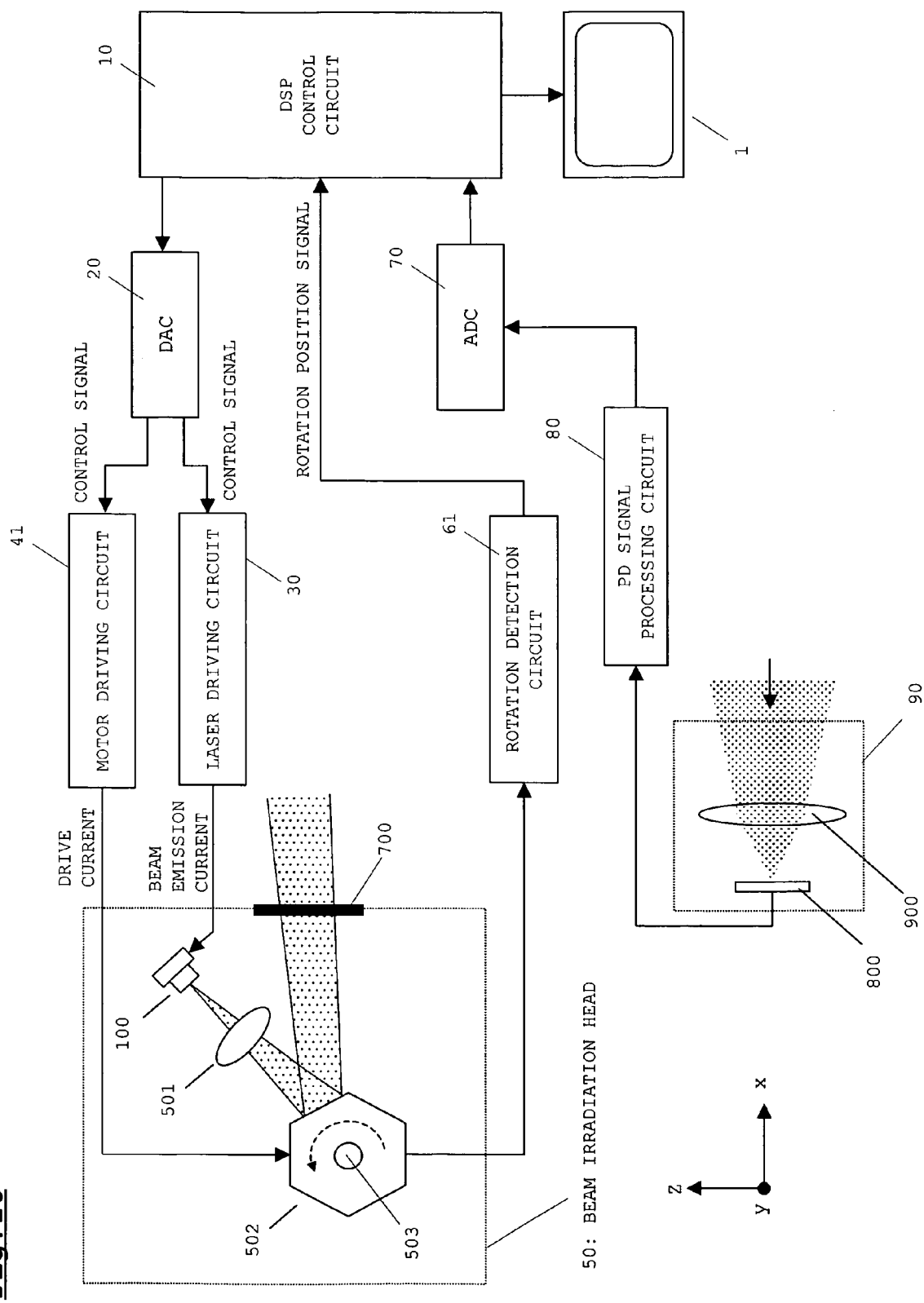
FIG. 16 is an explanatory view showing a method of applying trajectory servo according to the embodiment of the present invention.

FIG. 16 shows a configuration where a polygon mirror is employed. In the drawing, the same reference number as in FIG. 1 designates the same component as in FIG. 1.

The beam irradiation head 50 is provided with the semiconductor laser 100, a lens 501, a polygon mirror 502, and a motor 503. The lens 501 converts the laser beams emitted from the semiconductor laser 100 into almost collimated beams. The polygon mirror 502 has a polygonal prism shape, with a mirror surface formed on each side surface. The motor 503, in response to a driving signal from a motor driving circuit 41, rotates a rotation axis at a center of the polygon mirror 502.

When rotating the polygon mirror 502 while the laser beams are irradiated thereto, an incident angle of the laser beams to each mirror surface varies. With this, the laser beams reflected on the side surface of the polygon mirror 502 (the irradiated laser beams) are scanned in a direction in which the polygon mirror rotates.

Here, the mirror surfaces of the polygon mirror 502 are configured to have angles to the rotation axis adjusted so that, as an incidence of laser beams moves from one mirror surface to a following mirror surface, the scan trajectory on the target region in horizontal direction shifts by one block in longitudinal direction. The angles of the mirror surfaces are also adjusted so that, when the scan trajectory in horizontal direction is at lowermost blocks, the scan trajectory in horizontal direction shifts to uppermost blocks as the incidence of laser beams moves to the next mirror surface.

With the angles of the mirror surfaces of the polygon mirror 502 are thus adjusted, the scan operation is performed in response to the rotation of the polygon mirror 502 according to the trajectory, for example, as shown in FIG. 7B.

Note that the exemplar configuration shown in FIG. 16 does not include the beam splitter 400, the converging lens 500, and the PSD 600 that are present in the example of FIG. 1. This is because the irradiation position of the laser beams can be detected based on a rotational position of the polygon mirror 502. Specifically, in the exemplar configuration shown in FIG. 16, a rotation synchronous signal is outputted from the motor 503 to a rotation detection circuit 61. The rotation detection circuit 61 sequentially detects the rotation position of the polygon mirror 503 based on the inputted rotation synchronous signal, and then outputs the detection results to the DSP control circuit 10. The DSP control circuit 10 detects the irradiation position of the radiated laser beams on the target region based on the inputted rotation synchronous signal.

The scan operation by the radiated laser beams of the exemplar configuration shown in FIG. 16 is performed in the same manner as in the case of the above described configuration shown in FIG. 1. However, in the exemplar configuration shown in FIG. 16, the polygon mirror 502 is merely driven to rotate monotonously in a single direction. In the case where the polygon mirror 502 rotates in a constant speed, the scan speed in horizontal direction is also constant, and accordingly, the pulsed emission of the radiated laser beams is also at a constant pulse interval, as in the case of FIG. 9. If the rotation speed of the polygon mirror 502 is not stable, the timing for the laser beam emission may be controlled according to the rotational position of the polygon mirror 502. In addition to the above, the update processing of the reflected laser beam amount table, the detection processing of the dirt block, and the update processing of the emitted laser beam amount table are performed in the same manner as in the above described embodiment.

Note that, in the above embodiment, the description has been given assuming that the difference in the amounts of laser beams is caused by the dirt on the output window. Other factors that can cause the difference in the amounts of laser beams include a flaw and a crack in the output window.

The above embodiment is provided for exemplification only, and is not to limit the scope of the present invention.

What is claimed is:

1. A beam irradiation device comprising:
a light source that emits laser beams;
a scan means for scanning a target region with the laser beams emitted from the light source;
an irradiation position detection means for detecting irradiation positions of the laser beams on the target region;
a beam receiving means for detecting amounts of the laser beams reflected from the target region; and
an error position detection means for making correspondence between the irradiation positions detected by the irradiation position detection means and the amounts of the reflected laser beams detected by the beam receiving means, comparing the amounts of the reflected laser beams for the respective irradiation positions, and detecting an irradiation position at which an intensity of the laser beams is nonuniform in the target region; and
a light source control means for controlling the light source to change the intensity of the laser beams to the irradiation position that has been detected by the error position detection means; wherein
the scan means scans the target region with the laser beams in horizontal direction;
the light source control means controls the light source to irradiate the target region with the laser beams in pulse shape intensity with a predetermined interval, while the target region is scanned with the laser beams in horizontal direction by the scan means; and
the error position detection means compares a first amount of the reflected laser beams for a first irradiation position with a second amount of the reflected laser beams for a second irradiation position that is adjacent to the first irradiation position, detects if a ratio of the second amount of the reflected laser beams to the first amount of the reflected laser beams is less than a predetermined ratio of 1 or less, and determines the second irradiation position as the irradiation position at which the intensity of the laser beams is nonuniform in the target region in response to the detection.

2. The beam irradiation device according to claim 1, further comprising:
a notification means for notifying, based on a result of the detection by the error position detection means, that the intensity of the laser beams is nonuniform in the target region.

3. The beam irradiation device according to claim 1, wherein
the predetermined interval is an interval of blocks created by partitioning the target region into the blocks with a constant size.

4. The beam irradiation device according to claim 1, wherein
the scan means has the laser beams scan in horizontal direction at a constant speed, and
the light source control means has the laser beams be emitted in pulse shape intensity with a constant time interval.

5. The beam irradiation device according to claim 1, wherein
the scan means includes:
a lens into which the laser beams from the light source are incident;
an actuator that drives the lens in orthogonal direction to a light axis of the laser beams; and
a driving circuit that inputs a driving signal to the actuator.

6. The beam irradiation device according to claim 5, wherein
the actuator is driven based on a sign wave signal inputted from the driving circuit.

7. The beam irradiation device according to claim 5, wherein
the irradiation position detection means includes:
an optical element that separates a portion of the laser beams passing through the lens;
a beam receiving element that receives the laser beams separated by the optical element, and that outputs a signal corresponding to a position of the reception; and
a detection circuit that detects, based on the signal from the beam receiving element, the irradiation position of the laser beams in the target region.

8. A beam irradiation device comprising:
a light source that emits laser beams;
a lens into which the laser beams from the light source are incident;
an actuator that drives the lens in orthogonal direction to a light axis of the laser beams;
a driving circuit that inputs a driving signal to the actuator;
an optical element that separates a portion of the laser beams passing through the lens;
a beam receiving element that receives the laser beams separated by the optical element, and that outputs a signal corresponding to a position of the reception;
an irradiation position detection circuit that detects, based on the signal from the beam receiving element, the irradiation position of the laser beams in a target region;
a beam detector that detects amounts of the laser beams reflected from the target region; and
an error position detection circuit that makes correspondence between the irradiation positions detected by the irradiation position detection circuit and the amounts of the reflected laser beams detected by the beam receiving element, compares the amounts of the reflected laser beams for the respective irradiation positions, and detects an irradiation position at which an intensity of the laser beams is nonuniform in the target region; wherein the error position detection circuit compares a first amount of the reflected laser beams for a first irradiation position with a second amount of the reflected laser beams for a second irradiation position that is adjacent to the first irradiation position, and detects the second irradiation position as the irradiation position at which the intensity of the laser beams is nonuniform in the target region, when a ratio of the second amount of the reflected laser beams to the first amount of the reflected laser beams is less than a predetermined ratio.

9. A beam irradiation device comprising:

a light source that emits laser beams;

a polygon mirror into which the laser beams from the light source are incident;

an actuator that drives the polygon mirror to rotate;

a driving circuit that inputs a driving signal to the actuator;

a rotational position detection circuit that detects a rotational position of the polygon mirror;

an irradiation position detection circuit that detects, based on a result of the detection by the rotational position detection circuit, the irradiation position of the laser beams in a target region;

a beam detector that detects amounts of the laser beams reflected from the target region; and an error position detection circuit that makes correspondence between the irradiation positions detected by the irradiation position detection circuit and the amounts of the reflected laser beams detected by the beam detector, compares the amounts of the reflected laser beams for the respective irradiation positions, and detects an irradiation position at which an intensity of the laser beams is nonuniform in the target region; wherein the error position detection means compares a first amount of the reflected laser beams for a first irradiation position with a second amount of the reflected laser beams for a second irradiation position that is adjacent to the first irradiation position, and detects if a ratio of the second amount of the reflected laser beams to the first amount of the reflected laser beams is less than a predetermined ratio of 1 or less, and determines the second irradiation position as the irradiation position at which the intensity of the laser beams is nonuniform in the target region; in response to the detection.

10. The beam irradiation device according to one of claims 8, and 9, wherein a notification circuit that notifies, based on a result of the detection by the error position detection circuit, that the intensity of the laser beams is nonuniform in the target region.

11. The beam irradiation device according to one of claims 8, and 9, wherein a light source control circuit that controls the light source to change the intensity of the laser beams to the irradiation position that has been detected by the error position detection circuit.

* * * * *